ACCRETED ELEMENT

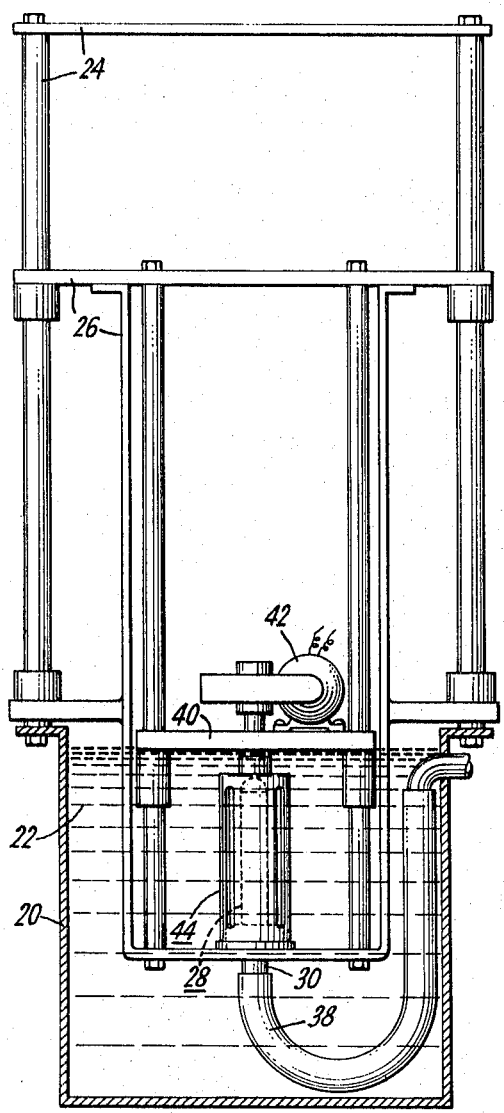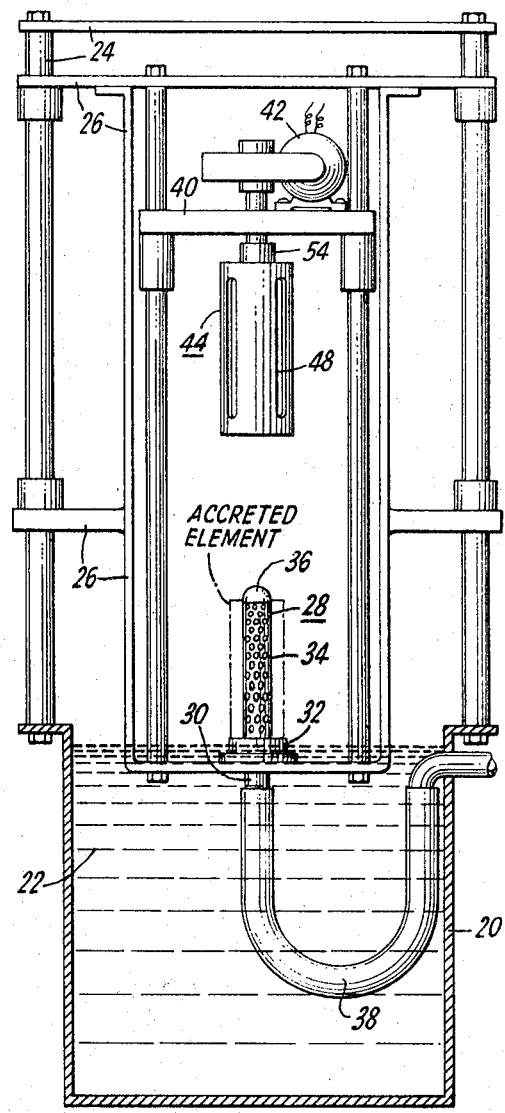

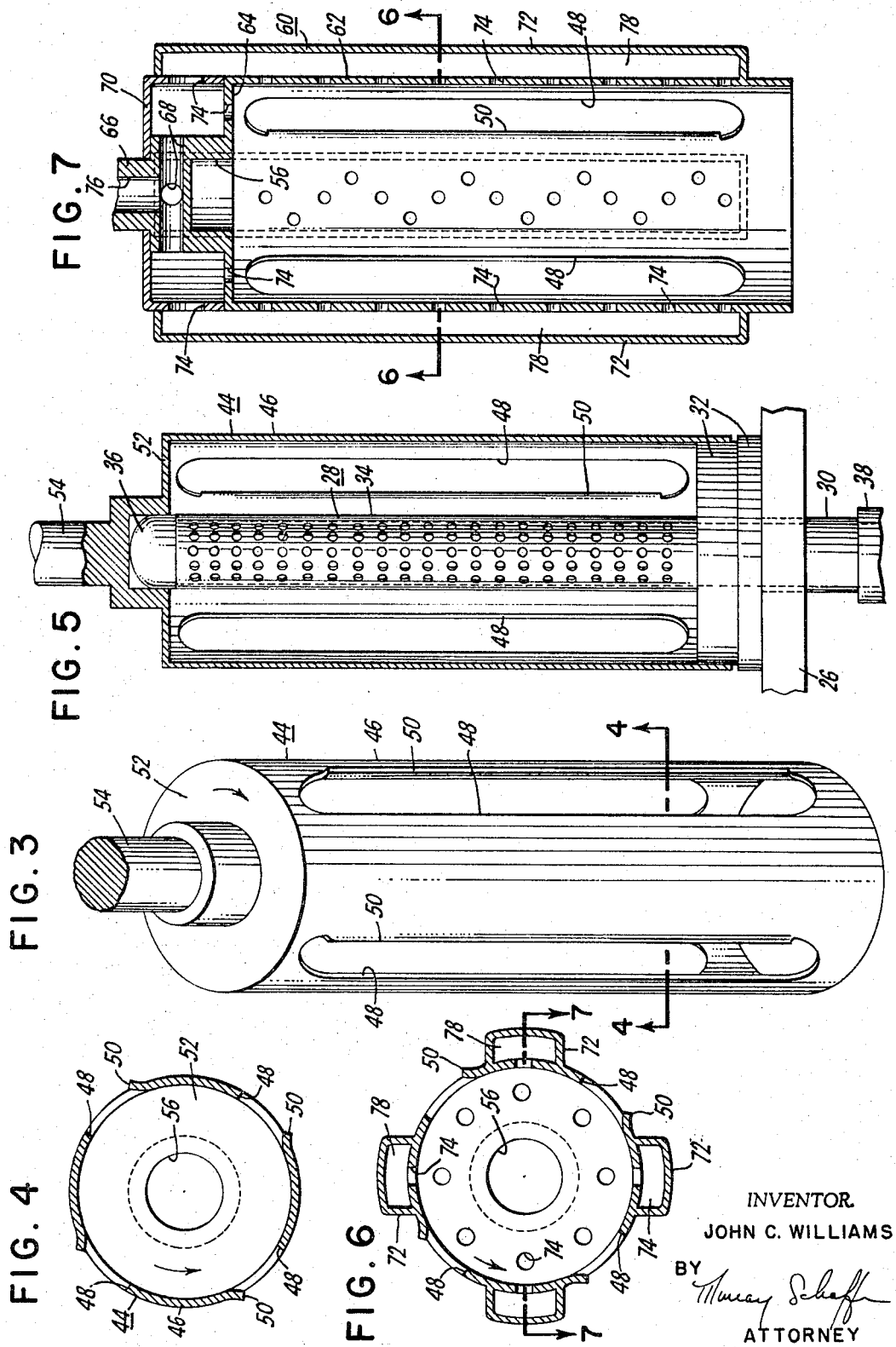

INVENTOR.
JOHN C. WILLIAMS
BY *Murray Schaffer*
ATTORNEY

United States Patent Office

3,442,757
Patented May 6, 1969

3,442,757
APPARATUS FOR FORMING ACCRETED
ARTICLES FROM A FIBROUS SLURRY
John Covington Williams, Meriden, Conn., assignor to
American Machine & Foundry Company, a corporation of New Jersey
Filed Dec. 20, 1965, Ser. No. 514,885
Int. Cl. D21j 7/00
U.S. Cl. 162—387                                  10 Claims

ABSTRACT OF THE DISCLOSURE

Apparatus for accreting porous articles from a liquid suspension of fibrous material including a former, means for causing the accretion of the fiber on the former and means spaced from and cooperating with the former to control the density and size of the accretion.

---

The invention here disclosed concerns the manufacture of moulded fiber articles by accretion from a slurry of fibers carried in a fluid vehicle flowing, under differential pressure, through a foraminous former whereon the fibers are deposited. More particularly it is concerned with the control of the thickness of accretion and the quality of the "bark" surface, that is, the surface on which the fibers are deposited, or in other words the up-stream side of the deposit of fibers.

Most particularly the invention concerns the manufacture of thick-walled tubular objects such as filter elements. Examples of such filter elements and the heretofore accepted method of manufacture are shown in the patents to L. E. Anderson, U.S. 2,539,767 and 2,539,768 and/or in the patent to C. J. Krogel 2,802,405.

In the case of the manufacture of the above mentioned type of filter by the known methods it has been usual to trim the rough element, while in the accreting tank, by jets of liquid; the use of a tubular, trepanning type of saw has also been suggested. Due to the lack of strength of the wet element, which, by these methods, can only be trimmed after accretion has been stopped, the bark surface is usually torn quite deeply and the element is frequently cracked. In any event it is necessary to make the elements very much larger in diameter (25% or more) than the diameter of the finished product. After the article has been resin impregnated and cured, the excess material, which has no salvage value, has to be removed by sawing or grinding or both to uncover a desirable and uniform surface.

An object of the invention is to provide accretion apparatus affording close control of the size of the element whereby excessive trimming and wastage of material is avoided.

Another object is to avoid the undesirable aeration and agitation of the fiber bearing slurry, caused by the action of the trimming jets of the prior art.

A further object is to provide a means of controlling, during accretion, the density of the element, so that minor variations in slurry characteristics will have no marked effect on the end product of the method.

Still another object is to afford support to the element during removal from the slurry, so as to avoid the danger of cracking.

Yet another object is to facilitate removal of the accreted article from its former and its placement on to a receiving device, such as a transporter, without manual manipulation.

Additional objects will be apparent to those skilled in the art on reading the disclosure.

Turning to the drawings:

FIGURE 1 is a vertical elevation, largely schematic and partly in section, of an embodiment of the invention suitable for accreting tubular structures having the bark on the outside. It is shown in the down, or accreting position.

FIGURE 2 is similar to FIGURE 1 but shows the parts in the up, or unloading position.

FIGURE 3 is a perspective view of the "controller" used in the structure of FIGURES 1 and 2.

FIGURE 4 is a cross-sectional view taken on the line 4—4 of FIGURE 3.

FIGURE 5 is a vertical center line sectional view of the controller of FIGURES 3 and 4, shown in its working position on a former or accreting arbor.

FIGURES 6 and 7 are generally similar to FIGURES 4 and 5 but illustrate a modification whereby an accreted article may be held in, or ejected from the controller.

Throughout the drawings like reference numerals indicate like parts.

Figure 8:
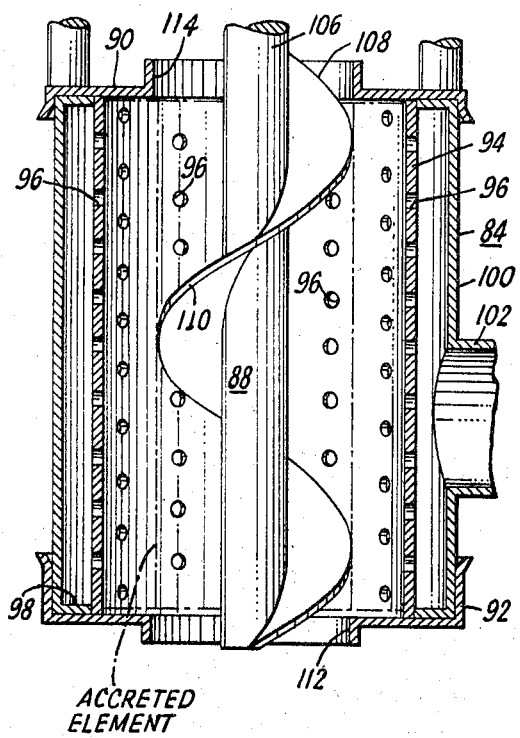
FIGURE 8 is a longitudinal center line sectional view of another type of foraminous former with its co-operating controller, suited for accreting a tubular article with the bark on the inner surface.

Referring first to FIGURES 1 and 2, the numeral 20 indicates an accreting or felting tank containing a slurry 22 suited for the purpose in hand and comprising, for example, water and wool fibers. Well known equipment, such as agitators, level controls, plumbing, etc. is not shown, as it is unnecessary for an understanding of the invention.

A suitable frame-work 24, is mounted on the tank 20, in any convenient manner and carries an elevator portion 26 readily moved up and down between the positions indicated in FIGURES 1 and 2. An accreting former 28 is mounted on the lower part of the elevator 26 and comprises a connector or nipple 30, a generally cylindrical base 32, a foraminous tube 34 and an imperforate tip 36. A flexible hose 38 is secured to nipple 30 and leads to a suction pump or other source of sub-atmospheric pressure (not shown) whereby the slurry 22, may be drawn through the former 28, depositing thereon its fiber content in the usual manner. The former 28 is, in the embodiment here shown, arranged to move with the elevator 26, but not to move independently thereof.

Carried by the elevator 26, and arranged to move therewith and to also have independent up and down movement thereon, it a support structure 40, comprising an electric gear-head motor 42, which carries and also affords rotary motion to the "controller" 44. The controller 44 as may be best seen in FIGURE 5 comprises a metallic cylinder 46, open at its lower end, and there proportioned for rotary and sliding supported engagement with the base 32; it has a number of openings or ports 48, having out-turned lips 50, and is closed at its upper end by the transverse wall 52 to which is attached the spindle 54 having a cavity 56 at its lower end, which is suited for rotary supporting engagement with the tip 36 of former 28. The upper end of the spindle 54 is secured in any convenient manner to the out-put shaft of motor 42. The means by which the elevator 26, and support structure 40 are given their up and down motions, are not shown as they may be of any convenient type such as air cylinders, electric motors, etc., and require only ordinary mechanical skill to arrange.

When an element is to be accreted, the apparatus above described is positioned as shown in FIGURE 1 with the elevator 26 in its lowest position and the support structure 40 in its lowest position thereon. This places the former 28 below the surface of the slurry 22 and within controller 44. If suction is now applied to the hose 38, slurry will flow through the ports 48, fibers from the slurry will be deposited on the former 28 and the water will pass therethrough to any convenient discharge point (not shown). While this is taking place the controller 44 is being rotated by motor 42 in the direction indicated by the arrow in FIGURE 3. The rotation of controller 44 with its ports 48 results in even distribution of fibers along and around the former 28, tending to eliminate the effects of any possible uneven slurry mixture within tank 20. When the fibers have been accreted to the full inside diameter of the former 44 they will no longer accumulate, but will be wiped off by the lips 50, which will at the same time afford a slight compacting or smoothing action to the outer surface of the element so accreted.

After accretion has been completed the elevator 26 may be raised to its upper position from the slurry 22 and then, after that has been done, the support structure 40 can be raised on the elevator 26 so as to lift the preferably still rotating controller 44 and place it above and well clear of the former 28, bringing the parts to the positions shown in FIGURE 2. Suction may now be cut off from hose 38, the motor 42 switched off and the accreted element removed from the former 28 for such drying and resin impregnations etc., as is necessary.

When the impregnating resin has been cured, the bark surface of the element may, if necessary, be removed by grinding or other suitable operation, so as to eliminate any resin skin, which might otherwise close off at least some of the normally open surface. The quantity of material to be so removed is minute compared with that which must be removed when following prior art methods.

In addition to the diminution in the amount of material removed when finishing the element, other advantages accure. As the lips 50 rotate around the accreted body they tend to lay the fibers in a circumferential direction and provide a uniform surface condition which results in the resin impregnation at, and adjacent to the outer surface of the element, being much more regular than in prior art products. The envelopment of the element by a rigid support, while being lifted from the slurry and during its final draining by suction, eliminates the cracks which were frequently caused by the sloughing off of the outer accreted fibers during emergence of the element from the slurry, when made by earlier methods. Further, the new method affords firm and well shaped ends to the elements and largely eliminates the need for transverse trimming.

As earlier described, the lips 50 have a slight compacting action on the accreted fibers when the element has attained its full diameter. The compacting has a braking effect on the controller 44 and causes the motor 42 to draw more current. Advantage may be taken of this condition by inserting a current sensitive relay (not shown) in the line to the motor so that when the motor current draw indicates the compacting action is taking place the relay may initiate the change of operations necessary to terminate accretion and cause the apparatus to assume the position shown in FIGURE 2.

Turning next to FIGURES 6 and 7; these show a controller 60 generally similar to the earlier described controller 44 but modified by the provision of air passages which facilitate manipulation of the accreted element. The controller comprises a metallic cylinder 62, shaped at its lower end for rotary and sliding engagement with base 32 and having ports 48 and lips 50 as earlier described. Its upper end is closed by a transverse wall 64 to which is secured a hollow spindle 66, cross drilled as at 68 and having a cavity 56 at its lower end for engagement with the tip 36 of former 28. An inverted cup 70 is secured to the transverse wall 64 and to spindle 66 in the position shown and trough-like channel members 72 extend therefrom axially along the exterior of the cylinder 62. A series of holes 74 serve to connect the interior of the cylinder 62 with the drilling 76 in the spindle 66, via the passages 78 defined in the above described structure.

Were the controller 60 substituted for the controller 44 shown in FIGURES 1 and 2 a rotary connector of any convenient type would be used to connect the drilling 76 to a valve (not shown) affording both suction and compressed air. During accretion the aforementioned valve would be closed and the passages 78 at atmospheric pressure. On completion of accretion the elevator 26 would, as earlier described, be raised to its upper position, suction cut off from the former 28 and the motor 42 stopped. Suction would next be applied through drilling 76 to passages 78 so as to hold the element within the controller 60. Thereafter the support structure 40 would move to its upper position, suction would be cut off and air under slight pressure applied in its stead to passages 78, causing the element to be ejected from the controller to the hand of an operator or to any appropriate conveying mechanism, or receptacle.

Figure 9:
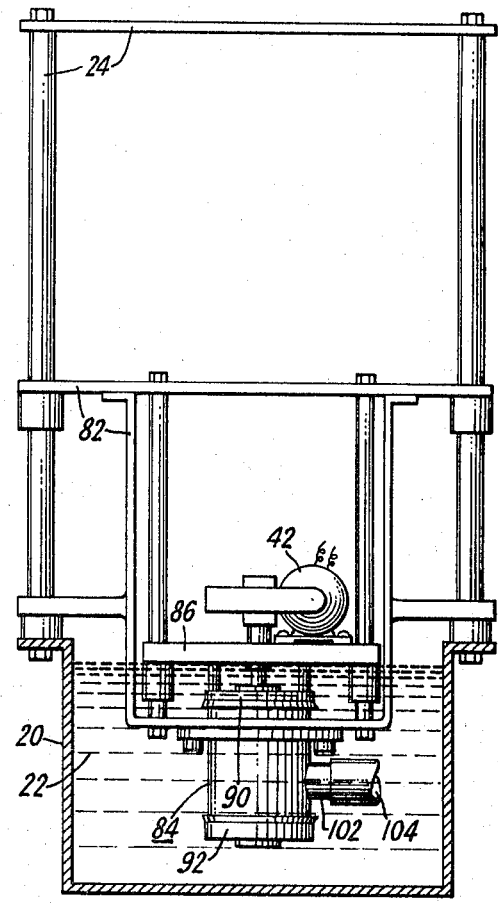
FIGURE 9 is generally similar to FIGURE 1 but using the former and controller of FIGURE 8 and shown in the down, or accreting position.
Figure 10:
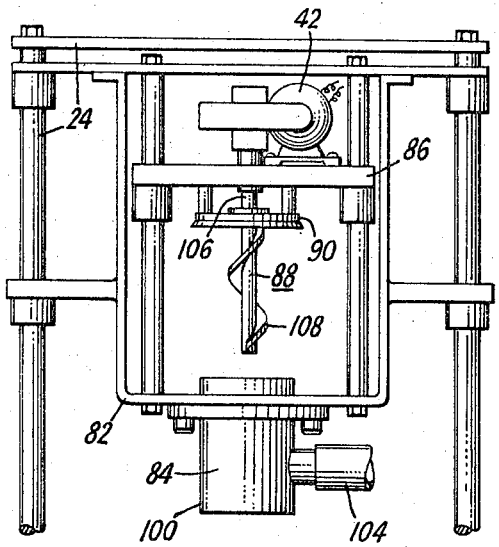
FIGURE 10 is a fragmentary view generally similar to FIGURE 2 but showing the parts of FIGURE 9 in the up position.

FIGURES 8, 9 and 10 are concerned with an embodiment of the invention arranged for accreting tubular bodies having their external dimensions governed by the shape and size of the interior surface of the foraminous former, and their inside diameter governed by the controller; the inner surface being the bark side. This arrangement affords products of radially graded density with the densest portion on the outside, it offers some distinct advantages in the case of filter elements having fluid flow from the inside to the outside, as the finest part of the filter, which usually is the first to be plugged, has the largest volume. The arrangement also allows for the accretion of objects having non-circular or non-cylindrical exteriors; they may be oval, polygonal, tapered or stepped etc. The inner diameters must follow the shape of revolution swept by the rotating controller and may be stepped or tapered as desired.

Considering FIGURES 8, 9 and 10 in detail; the arrangement is generally similar to that earlier explained regarding FIGURES 1 and 2. An accreting or felting tank 20 contains a suitable slurry 22 of fibers or other suitable material in a liquid and has mounted on or over it in any suitable manner a framework 24 which carries an elevator 82 readily moved up and down, between the positions shown on the drawings by air cylinders or other convenient means (not shown). An accreting former 84 is mounted by any convenient means on the lower part of the elevator 82 and when the latter is in its lowest position, is completely submerged in the slurry 22 (see FIGURE 9) but when the elevator 82 is in its upper position, the former 84 is held high enough above the slurry for an accreted article to be withdrawn downwards without coming in contact with it. Carried by the elevator 82 and arranged to move therewith and also to have independent up and down movement thereon is a support structure 86 comprising an electric gear head motor 42 which carries and affords rotary motion to the spiral conveyor-like controller 88, it also carries the upper cover 90 of the former 84 on which it is a slip fit. A lower cover 92 is also provided, it may be retained in place by friction or by spring clips, etc. as is most convenient. The former 84 comprises an inner foraminous sleeve 94, preferably of sheet metal suitably perforated as at 96, secured to the radially inwardly turned end flanges 98 of the jacket 100, which is furnished with a nipple 102 for connection via a flexible hose 104, to a suction pump or other source of sub-atmospheric pressure (not shown). The controller 88 resembles a screw-conveyor, it comprises a spindle 106 and a spiral vane 108, the outer edge 110 of which is preferably smooth and well rounded so as to slightly compact the fibers of the accreted element when it has built up to the maximum wall thickness permitted by the sweep of the controller. The upper end of the spindle, may be of any convenient shape and size for connection with the output shaft of the gear head motor 42.

When an element is to be accreted by the above described equipment then, starting from the position shown in FIGURE 10, the lower cover 92 is put in place on the former 84, the support structure 86 is lowered to its lowest position on the elevator 82 so that the controller 88 passes through the former 84 and the upper cover assumes the position shown in FIGURES 8 and 9. The elevator is next lowered so that all parts take the position shown in FIGURE 9 with the former 84 entirely submerged; then with the motor 42 running and suction turned on to hose 104 an element will be accreted within sleeve 94, from slurry 22 flowing through holes 114 and 112, in covers 90 and 92 respectively. Rotation of the controller 88 will limit the thickness of the deposit of fibers or other material and its spiral vane 108 will eject any excess at either the top or bottom depending on the direction of rotation, while the rounded edge of the vane will, as before mentioned, have a slight compacting action. The provision of a spiral vane, as described, has an advantage when making relatively small tubular objects as it serves to feed slurry into the former; but, where convenient a vane having no helix may be used. When accretion has been completed the apparatus may be returned to its uppermost position (see FIGURE 10) and suction shut off after the motor 42 has been stopped. If the lower cover 92 is now removed, the accreted element should fall from the former 84, if it does not, a slight puff of low pressure air into the annular space around sleeve 94 will release the elements and allow it to fall. It may be here mentioned that the covers 90 and 92 serve to define the ends of the body accreted within the former 84 and, as there is no relative motion between them and element during accretion, they may be shaped to afford a desired contour to the ends of the element.

It should be noted that the compacting action of the edge 110 of the ocntroller 88, and, similarly the lips 50 of controller 44, may be used to afford an accretion having a density greater than would be afforded solely by the pressure differential across the former.

The foregoing disclosure of apparatus has, in general, been made without suggesting alternate forms, however, this does not preclude other arrangements and structures which would still be within the scope of the invention. For example, an air turbine, or even a simple handle could replace the motor 42. The metallic cylinder 46 with outturned lips 50 might be replaced by a thick-walled plastic sleeve having rounded edges to the ports 48. The axially extending ports 48 might be replaced by a helical screw thread-like slot so as to displace fibers, wiped off during rotation, partly in an axial direction. Further, the vane 108 could be readily provided with a trailing lip at its outer edge, corresponding to the lips 50 of the former 44 of FIGURE 3. Obviously many such variations are possible without departing from the spirit of the invention.

What is claimed is:
1. Apparatus in the accretion of a porous article from a liquid suspension of fibrous material comprising a foraminous former for insertion into said suspension means for causing said liquid to flow through said former to thereby deposit said fibrous material on a surface thereof, a control means spaced from the surface of said former for limiting the thickness of the accreted material and means for rotating said former and said control means relative to each other about a common axis concurrently with the flow of fluid and the deposition of fibrous material to effect the accretion of said fibrous material within the limits defined by said former and said control means.

2. The apparatus in accordance with claim 1 including means for maintaining said foraminous member stationary and means for revolving said controls means thereto to define a figure of revolution about the surface of said former.

3. The apparatus in accordance with claim 1 wherein said control means comprises a helical edged member defining a closed path with respect to the surface of the foraminous former during relative movement.

4. The apparatus in accordance with claim 1 wherein said control means comprises a substantially cylindrical envelope means defining an opening having a configuration defining a figure of revolution with respect to the surface of the former when relative movement is effected.

5. The apparatus according to claim 4 including means for mounting said former and said envelope so as to be movable axially with respect to each other.

6. The apparatus in accordance with claim 4 wherein said opening is helical.

7. The apparatus in accordance with claim 4 wherein said opening runs axially of said envelope.

8. The apparatus in accordance with claim 4 wherein the envelope opening is provided with a radially outwardly flaring portion.

9. The apparatus according to claim 1 wherein said former comprises a substantially cylindrical member and said control means is spaced from the outer surface of said former.

10. The apparatus according to claim 1 wherein said former comprises a substantially cylindrical member and said control means is located within said cylindrical member.

References Cited

UNITED STATES PATENTS

| 2,366,212 | 1/1945 | Perry | 167—227 X |
| 3,028,911 | 4/1962 | DeLear | 162—227 X |
| 3,306,815 | 2/1967 | Mayne | 162—228 X |

DONALL H. SYLVESTER, *Primary Examiner.*

T. G. FERRIS, *Assistant Examiner.*

U.S. Cl. X.R.

162—227, 228, 406; 210—496